US007130511B2

United States Patent
Riester et al.

(10) Patent No.: US 7,130,511 B2
(45) Date of Patent: Oct. 31, 2006

(54) FLEXIBLE ACTIVE SIGNAL CABLE

(75) Inventors: Markus Riester, Wiesbaden (DE); Zhiming Zhuang, Buffalo Grove, IL (US); J. Yu Huinan, Buffalo Grove, IL (US); Nasir Irfan, Lake In The Hills, IL (US); Aroon V. Tungare, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 311 days.

(21) Appl. No.: 10/812,601

(22) Filed: Mar. 30, 2004

(65) Prior Publication Data

US 2005/0220393 A1    Oct. 6, 2005

(51) Int. Cl.
G02B 6/44    (2006.01)

(52) U.S. Cl. .................. 385/101; 385/14; 385/100; 385/114

(58) Field of Classification Search ................ 385/101
See application file for complete search history.

(56) References Cited

U.S. PATENT DOCUMENTS

| 5,375,184 | A | * | 12/1994 | Sullivan | .................... 385/129 |
| 5,835,646 | A | | 11/1998 | Yoshimura et al. | |
| 5,902,435 | A | | 5/1999 | Meis et al. | |
| 5,981,064 | A | | 11/1999 | Burack et al. | |
| 6,005,991 | A | | 12/1999 | Knasel | |
| 6,069,991 | A | | 5/2000 | Hibbs-Brenner et al. | |
| 6,088,498 | A | | 7/2000 | Hibbs-Brenner et al. | |
| 6,091,874 | A | | 7/2000 | Higashi et al. | |
| 6,097,871 | A | | 8/2000 | De Dobbelaere et al. | |
| 6,404,960 | B1 | * | 6/2002 | Hibbs-Brenner et al. | ..... 385/52 |
| 6,709,607 | B1 | * | 3/2004 | Hibbs-Brenner et al. | ..... 216/24 |
| 2002/0136510 | A1 | | 9/2002 | Heinz et al. | |

FOREIGN PATENT DOCUMENTS

| EP | 1 304 911 A1 | 4/2003 |
| GB | 2 364 831 | 2/2002 |
| JP | 2001-264560 | 9/2001 |

OTHER PUBLICATIONS

Bristow, J. "Optically Interconnected Multichip Module Development" OE Reports, Dec. 1994. http://www.spie.org/app/publications/magazines/oerarchive/december/optically_interconnec . . .

* cited by examiner

Primary Examiner—Frank G. Font
Assistant Examiner—James P. Hughes
(74) Attorney, Agent, or Firm—James A. Lamb

(57) ABSTRACT

A flexible active signal cable (100, 200) includes a flexible printed circuit substrate (105), two electrical connectors (110), at least two metal conductors (115), at least one flexible optical waveguide (120), an optical transmitter (125), and an optical receiver (130). In some embodiments, the flexible active signal cable is less than 0.5 meters long and is capable of being wrapped and unwrapped from a 5 millimeter diameter mandrel 10,000 times with a low probability of failure at a test temperature, while supporting data rates greater than 25 megabits per second.

22 Claims, 1 Drawing Sheet

FLEXIBLE ACTIVE SIGNAL CABLE

FIELD OF THE INVENTION

The present invention is related to flexible signal cables, and in particular, flexible cables suitable for applications such as routing through hinges.

BACKGROUND

In handheld or mobile devices, high data throughput and supplying one or more DC power sources is often required between two components that move relative to each other. For example, for a "clam shell" cell phone or a typical laptop computer, the displays are separated from the baseband processors and the two are typically connected via flex cables (i.e., cables made from one or more layers of flexible printed circuit substrates) that pass through the region of the device hinge. In recent years, displays have provided higher resolution, better color and they serve more functions, increasing the data rate through the hinge region. Problems such as electromagnetic interference and mechanical breakdown increase because flex cables have had to adopt multilayer structure to accommodate the increased throughput.

High data throughput can be achieved by using optical fiber, which reduces electromagnetic interference. Cables that provide optical fiber for data transmission and metallic conductors for DC or AC power transmission have been described. The most typical arrangements described are combinations of coaxial cables. Another arrangement is described in U.S. publication 200201365A1, and may be characterized as a ribbon cable comprising a plurality of optical fibers and a plurality of solid or stranded metallic conductors molded into a parallel arrangement. These coaxial cables and the ribbon cable arrangement provide for high data throughput, but their cost per unit length is typically quite high and the termination of the optical and electrical conductors is costly.

BRIEF DESCRIPTION OF THE DRAWINGS

The present invention is illustrated by way of example and not limitation in the accompanying figures, in which like references indicate similar elements, and in which.

DETAILED DESCRIPTION OF THE DRAWINGS

Figure 1:
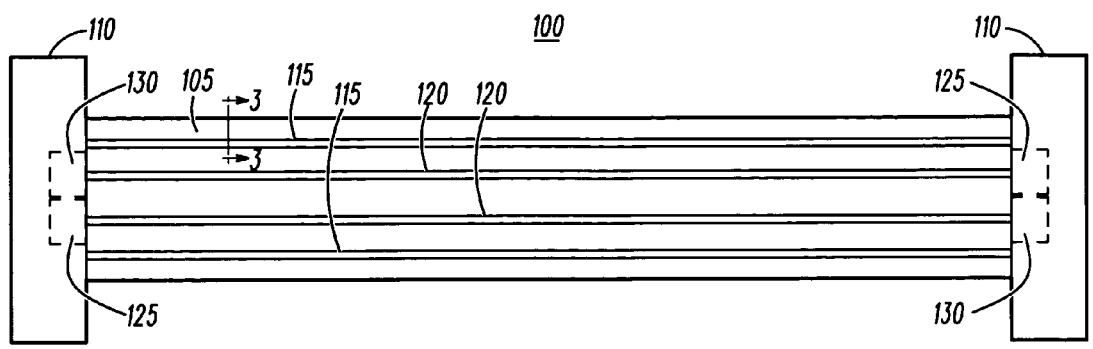
FIGS. 1 and 2 are plan view drawings that show flexible active signal cables, in accordance with some embodiments of the present invention.

Before describing in detail the particular flexible cable in accordance with the present invention, it should be observed that the present invention resides primarily in combinations of method steps and apparatus components related to flexible cables. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Referring to FIG. 1, a plan view drawing shows a flexible active signal cable 100 in accordance with some embodiments of the present invention. The flexible active signal cable 100 comprises a flexible printed circuit substrate 105 having two electrically insulating layers, two electrical connectors 110, two metal conductors 115, two flexible optical waveguides 120, two optical transmitters 125, and two optical receivers 130. The term active is included in the description of the flexible active signal cable 100 because there are at least two active devices (the optical transmitter 125 and optical receiver 130) in each flexible active signal cable 100. Hereafter, the flexible active signal cable 100 may be referred to more simply as a flexible signal cable 100. Each of the two electrical connectors 110 is located near one of two ends of the flexible printed circuit substrate 105. According to the present invention, other embodiments may include more complex topographies but would typically not be more complex than having more than three electrically insulating layers and for which all flexible optical waveguides extend from near one end to near another end without branches. For example, the flexible printed circuit substrate could alternatively have three connectors for an embodiment in which the flexible printed circuit substrate has one added branch. The flexible printed circuit substrate 105 may be fabricated from conventional polyimide or polyester materials. In some embodiments, the flexible printed circuit substrate may have only one insulating layer.

Each of the two metal conductors 115 is electrically connected at each end to one or more terminations (e.g., pins or sockets) of one of the two electrical connectors 110. The two metal conductors shown with reference to FIG. 1 conduct ground and a power source from one electrical connector to the other electrical connector, and may also be connected to the optical transmitter(s) 125 and/or optical receiver(s) 130. In other embodiments, there may be more than two metal conductors, but it is contemplated that there would not be more than 20. One additional metal conductor may be desirable to make the topography of power source connection to the optical transmitters 125 and optical receivers 130. Or, additional metal conductors may be desirable to carry a plurality of voltage sources having different values.

The flexible optical waveguides 120 are affixed to the flexible printed circuit substrate 105. In some embodiments, the flexible optical waveguides 120 each comprise an optical fiber that is adhered to the flexible printed circuit substrate, and the optical fiber may comprise polymer or glass. In other embodiments, at least one of the flexible optical waveguides 120 comprises a polymer waveguide lithographically fabricated on the substrate, or comprises an insulating layer or a portion of an insulating layer of the flexible printed circuit substrate 105. In yet other embodiments, at least one of the flexible optical waveguides 120 comprises a polymer waveguide embossed on the substrate, or as a layer or portion of a layer of the flexible printed circuit substrate 105. The waveguides 120 may be fabricated with other materials and in other manners, and still reflect the spirit of the invention. For the purposes of the description of the present invention, such fabrication of the waveguides 120 as a layer, as part of a layer, or on a layer will be termed to be fabricated "with the substrate", and the flexible optical waveguides 120 will be termed as being "affixed to" the substrate, even though the flexible optical waveguides 120 may be also be described as being within or being a part of the substrate.

Each of the two optical transmitters 125 is optically coupled to one end of one of the flexible optical waveguides 120 and electrically coupled to one of the electrical connectors 110, by which is meant that it is coupled a terminal of the electrical connector 110. Preferably, the coupling is a direct connection from a terminal of the electrical connector 110 to an input of the optical transmitter 125. Each optical transmitter 125 is a transducer that converts an electrical input signal to a modulated light signal that is coupled from the optical transmitter 125 to one of the two flexible optical waveguides 120. The electrical input signal is connected to the electrical connector 110 from a mating electrical connector (not shown in FIG. 1). The optical transmitter 125 is an electrical to optical transducer that may be a light emitting diode (LED), a laser diode or a vertical cavity surface emitting laser (VCSEL) device.

Each of the two optical receivers 130 is optically coupled to one end of one of the flexible optical waveguides 120 and electrically coupled to one of the electrical connectors 110, by which is meant that it is coupled a terminal of the electrical connector 110. Preferably, the coupling is a direct connection from a terminal of the electrical connector 110 to an output of the optical transmitter 125. Each optical receiver 130 is a transducer that converts a modulated optical input signal coupled to the optical receiver 130 from one of the waveguides 120 to an electrical signal that is connected by the electrical connector 110 to a mating electrical connector (not shown in FIG. 1). The optical receiver is an optical to electrical transducer that may be a photodiode or a phototransistor. Currently a cost effective set of optical transmitter 125 and optical receiver 130 is one that uses an LED and a photodiode or a phototransistor and operates using light in the 650 nanometer (nm) to 850 nm range. Using this cost effective transmitter/receiver component set, a data signal is conveyed from a conductor of one connector 110 through the optical transmitter 125, through the optical waveguide 120 to an optical receiver 130, and thence to a conductor of another connector 110 entirely as a serial data signal. In this embodiment, the modulation for the optical signal could be 100% amplitude modulation, allowing simple conversion by the optical transmitters 125 and optical receivers 130. However, in other embodiments, the optical modulation may be more complex.

The active surfaces of each of the optical transmitter 125 and optical receiver 130 may be in any appropriate orientation with reference to the surface of the flexible printed circuit substrate 105; parallel or perpendicular orientations are typical.

In the embodiment shown in FIG. 1, the optical receivers 130 and optical transmitters 125 are physically located within a housing of the electrical connectors 110. Alternatively, they may be located on the flexible printed circuit substrate 105 outside of the electrical connector 110.

In the embodiment shown in FIG. 1, there are two flexible optical waveguides 120, and associated optical transmitters 125 and receivers 130. In some embodiments, there may be only one optical waveguide 120, one optical transmitter 125 and one optical receiver 130. This may be beneficial when a bulk of data throughput is in one direction. A few metal conductors may carry a limited amount of data in the other direction.

Figure 2:
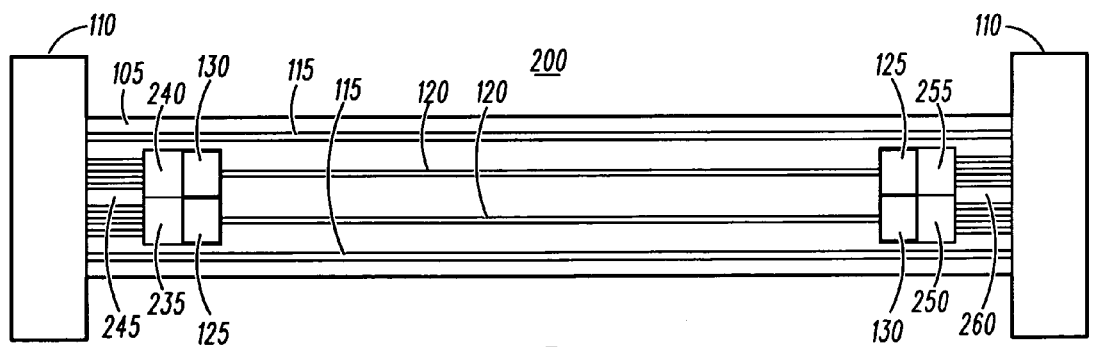

Referring to FIG. 2, a plan view drawing shows a flexible active signal cable 200, in accordance with some embodiments of the present invention. The flexible active signal cable 200 comprises the same components as the flexible active signal cable 100, but with the addition of two serial-to-parallel converters 240, 250, two parallel-to-serial converters 235, 255, and additional metal conductors 245, 260 to conduct parallel signals. In the embodiments shown in FIG. 2, the two serial-to-parallel converters 240, 250, two parallel-to-serial converters 235, 255, and additional metal conductors 245, 260 are shown external to the connectors 110, but in some embodiments, they may be physically located within the housings of the connectors 110. The use of serial-to-parallel and parallel-to-serial converters may be beneficial in a situation, for example, in which electrical signals have been conveyed as parallel signals using a multilayer flexible cable having only metallic conductors, but reliability problems have arisen due to a substrate having several layers or electromagnetic interference problems have arisen. In these embodiments, parallel electrical signals may be received by terminations of the electrical connectors 110 and conducted to the parallel-to-serial converters 235, 255 by conductors in the groups of conductors 245, 260, where they are converted to a serial electrical signal that is coupled to each of the optical transmitters 125, which converts the serial electrical signal to a modulated optical signal. Optical signals may be received by optical receivers 130 and converted to serial electrical signals, which are coupled to serial-to-parallel converters 240, 250 which convert the serial electrical signals to parallel electrical signals that are coupled to terminations of the electrical connectors 110 by conductors in the groups of conductors 245, 260. It will be appreciated that in some embodiments, a serial-to-parallel converter 240, 250 may be integrated in a single package with an optical receiver 130 and that a parallel-to-serial converter 235, 255 may be integrated into a single package with an optical transmitter 125. Optical modulation more complex than 100% amplitude modulation may be used in some serial/parallel conversion embodiments.

Figure 3:
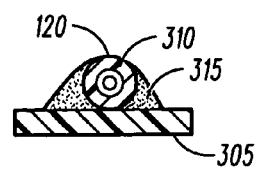
FIG. 3 is a cross sectional view drawing that shows a portion of the width of a flexible active signal cable at an optical waveguide, in accordance with some embodiments of the present invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Referring to FIG. 3, a cross-sectional drawing of a small portion of the width of the flexible active signal cable 100 and an optical waveguide 120 is shown, in accordance with some embodiments of the present invention. One of the optical waveguides 120 is adhered to the surface of a small portion 305 of the width of the flexible printed circuit substrate 105 by overlay material 315. The waveguide in this instance comprises a circular cross section plastic waveguide of approximately 500 microns diameter. The overlay material may comprise a polyester or polycarbonate sheet or thermoplastic material. Such a combination of items provides a highly flexible yet mechanically reliable signal cable. Other waveguides may be used that are, for instance range from 200 microns to 900 microns in diameter.

One summarization of the flexible signal cable according the present invention is that it comprises two electrical connectors separated by less than 0.5 meters, at least one optical waveguide essentially spanning the two electrical connectors, and two transducers, on a printed circuit substrate typically comprising no more than three insulating layers. One of the two transducers is at each of two ends of the flexible active signal cable and couples one of the two electrical connectors to an end of one of the at least one optical waveguide. The flexible active signal cable is capable of being wrapped and unwrapped from a 5 millimeter diameter mandrel 10,000 times at a test temperature that is appropriately related to the application for which the cable will be used, with a failure rate less than 100 parts per million (ppm), and wherein one of the at least one optical waveguides transmits an optical signal that has a data throughput of at least 25 megabits per second (Mps) transduced from electrical signals received at one of the two electrical connectors. In some embodiments, for example those intended for outdoor use, the test temperature may be 0 degrees centigrade. For embodiments intended strictly for indoor use, for example a printer powered by a main AC supply, the test temperature may be higher.

The flexible signal cable 100, 200 according embodiments of the present invention is a highly reliable yet economical alternative to flexible cables that are designed to carry data signals through hinged regions using a large plurality of metallic conductors. However, the data throughput of the flexible signal cable 100, 200 is typically less than 1 gigabit per second (Gbps) and in many instance is approximately 75 Mbps per optical waveguide, using the currently available cost effective types of materials and components described herein. (These data rates may increase over time with the availability of new cost effective materials and processes that are within the presently claimed invention). Such data throughputs are substantially less than the current data rates at which long haul fiber optic cables are used, such as 10–40 Gbps. Unlike such long haul cables, which are typically flexed only until they are installed, the flexible signal cable 100 of some embodiments of the present invention may be wrapped and unwrapped from a 5 millimeter diameter mandrel 10,000 times with a probability of mechanical failure that is less than 100 ppm at the test temperature. In some embodiments, the longest of the at least one flexible optical waveguide and two electrical conductors is less than 0.5 meters and the total optical loss in each optical path comprising loss in the one of the at least one flexible optical waveguide and coupling losses between the at least one flexible optical waveguide and the optical transmitter and receiver coupled thereto is between 5 and 35 db between 650–850 nanometers. In some embodiments, the total optical loss may be greater than 10 db and less than 40 db between 650–850 nanometers, and in some embodiments, greater than 20 db and less than 50 db between 650–850 nanometers. These types of losses are commensurate with maximum supported data rates up to 100 mega bits per second (Mbps) and in some instances up to 1 Gbps per optical waveguide using the configurations, modulation, and materials described herein.

Flexible active signal cables 100, 200 as described herein can be included in a variety of electronic devices such as cellular telephones, printers, and other consumer products ranging from portable music players to lap computers; military products such as communication radios and communication control systems; and commercial equipment such as factory robots, just to name some types and classes of electronic equipment. Flexible active signal cables 100, 200 as described herein are ideally suited for carrying data signals through hinged regions of such electronic devices or to a moving "head" such as a print head, from a source connector within the electrical device that is mated to one of the electrical connectors of the flexible active signal cable and couples input signals to the optical waveguide through a transducer. The input signals are converted to an optical signal that conveys information carried by the input signals using a data throughput that exceeds 25 Mbps (but is typically no more than 1 Gbps) to a sink connector within the electrical device that is mated another of the electrical connectors of the flexible active signal cable and coupled to the optical waveguide by another transducer. By using data throughput rates that are relatively low compared to many optical communication cables and by using transducers on the cable, a very economical and highly flexible cable is achieved that has only electrical terminations at the ends.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically.

The invention claimed is:

1. A flexible active signal cable, comprising:
   a flexible printed circuit substrate;
   two electrical connectors; each located near one of two ends of the flexible printed circuit substrate;
   at least two metal conductors connected at each end to one of the two electrical connectors;
   at least one flexible optical waveguide affixed to the flexible printed circuit substrate;
   an optical transmitter optically coupled to one of the two ends of at least one of the at least one flexible optical waveguide and electrically coupled to one of the two electrical connectors; and
   an optical receiver optically coupled to the other of the two ends of the at least one of the at least one flexible optical waveguide and electrically coupled to the other of the electrical connectors.

2. The flexible active signal cable according to claim 1, where the flexible printed circuit substrate has no more than three electrically insulating layers.

3. The flexible active signal cable according to claim 1, wherein the optical transmitter and receiver are electrically connected, respectively, to the two electrical connectors.

4. The flexible active signal cable according to claim 1, further comprising at least one electrical parallel-to-serial converter that is electrically connected to the optical transmitter and electrically connected to one of the two electrical connectors.

5. The flexible active signal cable according to claim 1, further comprising at least one electrical serial-to-parallel converter that is electrically connected to the optical receiver and electrically connected to one of the two electrical connectors.

6. The flexible active signal cable according to claim 1, wherein the number of electrical conductors is no more than 20.

7. The flexible active signal cable according to claim 1, wherein a maximum supported data rate per flexible optical waveguide is at least 25 megabits per second.

8. The flexible active signal cable according to claim 1, wherein the longest of the at least one flexible optical waveguide and the at least two metal conductors is less than 0.5 meters and a total optical loss in each optical path comprising loss in the one of the at least one flexible optical waveguide and coupling losses between the at least one flexible optical waveguide and the optical transmitter and receiver coupled thereto is greater than 5 db between 650–850 nanometers.

9. The flexible active signal cable according to claim 8, wherein the total optical loss is greater than 10 db between 650–850 nanometers.

10. The flexible active signal cable according to claim 8, wherein the total optical loss is greater than 20 db between 650–850 nanometers.

11. The flexible active signal cable according to claim 1, wherein the at least one flexible optical waveguide comprises an optical fiber that is adhered to the flexible printed circuit substrate.

12. The flexible active signal cable according to claim 11, wherein the optical fiber comprises one of polymer and glass.

13. The flexible active signal cable according to claim 1, wherein the at least one flexible optical waveguide comprises a polymer waveguide fabricated with the flexible printed circuit substrate.

14. The flexible active signal cable according to claim 1, wherein the flexible printed circuit substrate comprises at least one of polyimides and polyesters.

15. The flexible active signal cable according to claim 1, wherein the flexible active signal cable can be wrapped and unwrapped from a 5 mm diameter mandrel 10,000 times with a probability of failure that is less than 100 parts per million at a test temperature.

16. The flexible active signal cable according to claim 1, wherein the optical transmitter is one of an LED, a laser diode, or a VCSEL device.

17. The flexible active signal cable according to claim 1, wherein the optical receiver is a photodiode or a phototransistor.

18. The flexible active signal cable according to claim 1, wherein active surfaces of each of the optical transmitter and optical receiver are in one of a parallel and perpendicular orientation with reference to a surface of the flexible printed circuit substrate.

19. An electronic device, comprising:
a flexible active signal cable that comprises a flexible printed circuit substrate to which there are affixed two electrical connectors separated by less than 0.5 meters, that further comprises at least one optical waveguide coupled to the electrical connectors through active transducers that can be powered through electrical conductors that are coupled to the two electrical connectors, wherein the two electrical connectors, the at least one optical waveguide, the active transducers, and the electrical conductors are affixed to the flexible printed circuit substrate; and
a source connector mated to one of the two electrical connectors, the source connector carrying a set of electrical signals having a maximum combined data throughput equal to or greater than 25 megabits per second (kbps) that is transmitted by one of the at least one optical waveguides from the one of the two electrical connectors to the other of the two electrical connectors.

20. The flexible active signal cable according to claim 19, wherein the flexible active signal cable is capable of being wrapped and unwrapped from a 5 millimeter diameter mandrel 10,000 times at a test temperature with a failure rate that is less than 100 parts per million.

21. A flexible active signal cable, comprising:
two electrical connectors separated by less than 0.5 meters that are affixed to a flexible printed circuit substrate;
at least one optical waveguide essentially spanning the two electrical connectors; and
a transducer at each of two ends of the flexible active signal cable that couples one of the two electrical connectors to an end of one of the at least one optical waveguide,
wherein one of the at least one optical waveguides transmits an optical signal that has a data throughput of at least 25 megabits per second transduced from electrical signals received at one of the two electrical connectors.

22. The flexible active signal cable according to claim 21, wherein the flexible active signal cable is capable of being wrapped and unwrapped from a 5 millimeter diameter mandrel 10,000 times at a test temperature with a failure rate less than 100 parts per million.

* * * * *

UNITED STATES PATENT AND TRADEMARK OFFICE
CERTIFICATE OF CORRECTION

PATENT NO. : 7,130,511 B2  Page 1 of 1
APPLICATION NO. : 10/812601
DATED : October 31, 2006
INVENTOR(S) : Huinan J. Yu et al.

It is certified that error appears in the above-identified patent and that said Letters Patent is hereby corrected as shown below:

On Title page item 75 should read

| Inventors: | Huinan J. YU, | Buffalo Grove, IL |
|---|---|---|
| | Irfan NASIR, | Lake In The Hills, IL |
| | Markus RIESTER | Wiesbaden (DE) |
| | Aroon V. TUNGARE | Winfield, IL |
| | Zhiming ZHUANG | Buffalo Grove, IL |

Signed and Sealed this

Twenty-third Day of January, 2007

JON W. DUDAS
*Director of the United States Patent and Trademark Office*